US008626130B2

(12) United States Patent
Wesley

(10) Patent No.: US 8,626,130 B2
(45) Date of Patent: Jan. 7, 2014

(54) SYSTEM AND METHOD FOR USER CONTROLLED LOG-IN; INTERACTING AND LOG-OUT

(75) Inventor: Robert J. Wesley, Wellesley, MA (US)

(73) Assignee: Modiv Media, Inc., Quincy, MA (US)

( * ) Notice: Subject to any disclaimer, the term of this patent is extended or adjusted under 35 U.S.C. 154(b) by 793 days.

(21) Appl. No.: 11/209,862

(22) Filed: Aug. 23, 2005

(65) Prior Publication Data

US 2007/0050259 A1    Mar. 1, 2007

(51) Int. Cl.
*H04M 3/42* (2006.01)
*H04M 1/725* (2006.01)
*G06Q 30/00* (2012.01)

(52) U.S. Cl.
USPC .................. 455/414.1; 455/412.2; 455/456.5; 705/14.58; 705/14.64; 705/14.66

(58) Field of Classification Search
USPC ........ 455/406, 407, 408, 412.1, 412.2, 456.1, 455/456.3, 456.2, 456.4, 456.5, 456.6, 455/414.1; 705/1, 14, 15, 16, 17, 18, 26, 705/27, 14.49, 14.57, 14.58, 14.64, 14.65, 705/14.66, 14.67
See application file for complete search history.

(56) References Cited

U.S. PATENT DOCUMENTS

| | | | | |
|---|---|---|---|---|
| 6,353,739 B1* | 3/2002 | Davis | | 455/428 |
| 6,386,450 B1* | 5/2002 | Ogasawara | | 235/383 |
| 6,647,269 B2* | 11/2003 | Hendrey et al. | | 455/456.3 |
| 6,711,474 B1* | 3/2004 | Treyz et al. | | 701/1 |
| 6,868,391 B1* | 3/2005 | Hultgren | | 705/26 |
| 6,879,965 B2* | 4/2005 | Fung et al. | | 705/39 |
| 6,912,398 B1* | 6/2005 | Domnitz | | 455/461 |
| 6,931,254 B1* | 8/2005 | Egner et al. | | 455/456.3 |
| 6,996,579 B2* | 2/2006 | Leung et al. | | 1/1 |
| 7,027,803 B2* | 4/2006 | Dafcik | | 455/414.1 |
| 7,035,649 B1* | 4/2006 | Chang et al. | | 455/456.3 |
| 7,116,977 B1* | 10/2006 | Moton et al. | | 455/419 |
| 7,123,879 B2* | 10/2006 | Koketsu et al. | | 455/41.2 |
| 7,127,261 B2* | 10/2006 | Van Erlach | | 455/456.5 |
| 7,221,949 B2* | 5/2007 | Clough | | 455/456.3 |
| 7,239,871 B2* | 7/2007 | Shamp et al. | | 455/422.1 |
| 7,248,855 B2* | 7/2007 | Joyce et al. | | 455/406 |
| 7,305,365 B1* | 12/2007 | Bhela et al. | | 705/51 |
| 7,668,754 B1* | 2/2010 | Bridgelall | | 705/26.9 |
| 7,684,809 B2* | 3/2010 | Niedermeyer | | 455/456.3 |
| 7,865,414 B2* | 1/2011 | Fung et al. | | 705/35 |
| 8,065,235 B2* | 11/2011 | Narayanaswami et al. | | 705/64 |
| 2001/0001239 A1* | 5/2001 | Stewart | | 342/457 |
| 2001/0051876 A1* | 12/2001 | Seigel et al. | | 705/1 |
| 2002/0101993 A1* | 8/2002 | Eskin | | 380/270 |
| 2002/0115449 A1* | 8/2002 | Allen | | 455/456 |
| 2002/0147642 A1* | 10/2002 | Avallone et al. | | 705/14 |
| 2002/0151313 A1* | 10/2002 | Stead | | 455/456 |

(Continued)

*Primary Examiner* — Christopher M Brandt
(74) *Attorney, Agent, or Firm* — Pillsbury Winthrop Shaw Pittman LLP

(57) ABSTRACT

A system in which a user controls the log-in, transaction, and log-out process with respect to a merchant. The user's presence at the merchant's facility triggers the log-in process, such that the merchant's systems become aware of the user's presence. Once the user is registered with the merchant, information and services become available to the user without further action required by the user. Transactions are facilitated, specials are brought to the user's attention, personal shopping becomes available while the user remains in the facility. Upon leaving the facility, or after a certain elapsed time with a transaction being consummated, the user is logged-out of the system.

54 Claims, 6 Drawing Sheets

(56) References Cited

U.S. PATENT DOCUMENTS

| | | | |
|---|---|---|---|
| 2002/0183070 A1* | 12/2002 | Bloebaum et al. | 455/456 |
| 2003/0014330 A1* | 1/2003 | Showghi et al. | 705/26 |
| 2003/0100315 A1* | 5/2003 | Rankin | 455/456 |
| 2003/0162536 A1* | 8/2003 | Panico | 455/422 |
| 2003/0233278 A1* | 12/2003 | Marshall | 705/14 |
| 2004/0023666 A1* | 2/2004 | Moon et al. | 455/456.1 |
| 2004/0083170 A1* | 4/2004 | Bam et al. | 705/40 |
| 2004/0215467 A1* | 10/2004 | Coffman et al. | 705/1 |
| 2005/0170850 A1* | 8/2005 | Edwards et al. | 455/456.4 |
| 2006/0089792 A1* | 4/2006 | Manber et al. | 701/207 |
| 2006/0099964 A1* | 5/2006 | Barrese et al. | 455/456.3 |
| 2006/0099965 A1* | 5/2006 | Aaron | 455/456.3 |
| 2006/0105783 A1* | 5/2006 | Giraldin et al. | 455/456.3 |
| 2006/0143091 A1* | 6/2006 | Yuan et al. | 705/26 |
| 2006/0171382 A1* | 8/2006 | Mohri et al. | 370/389 |
| 2006/0178986 A1* | 8/2006 | Giordano et al. | 705/40 |
| 2006/0194569 A1* | 8/2006 | Hsueh | 455/412.1 |
| 2006/0194592 A1* | 8/2006 | Clough | 455/456.3 |
| 2007/0173266 A1* | 7/2007 | Barnes, Jr. | 455/456.1 |

* cited by examiner

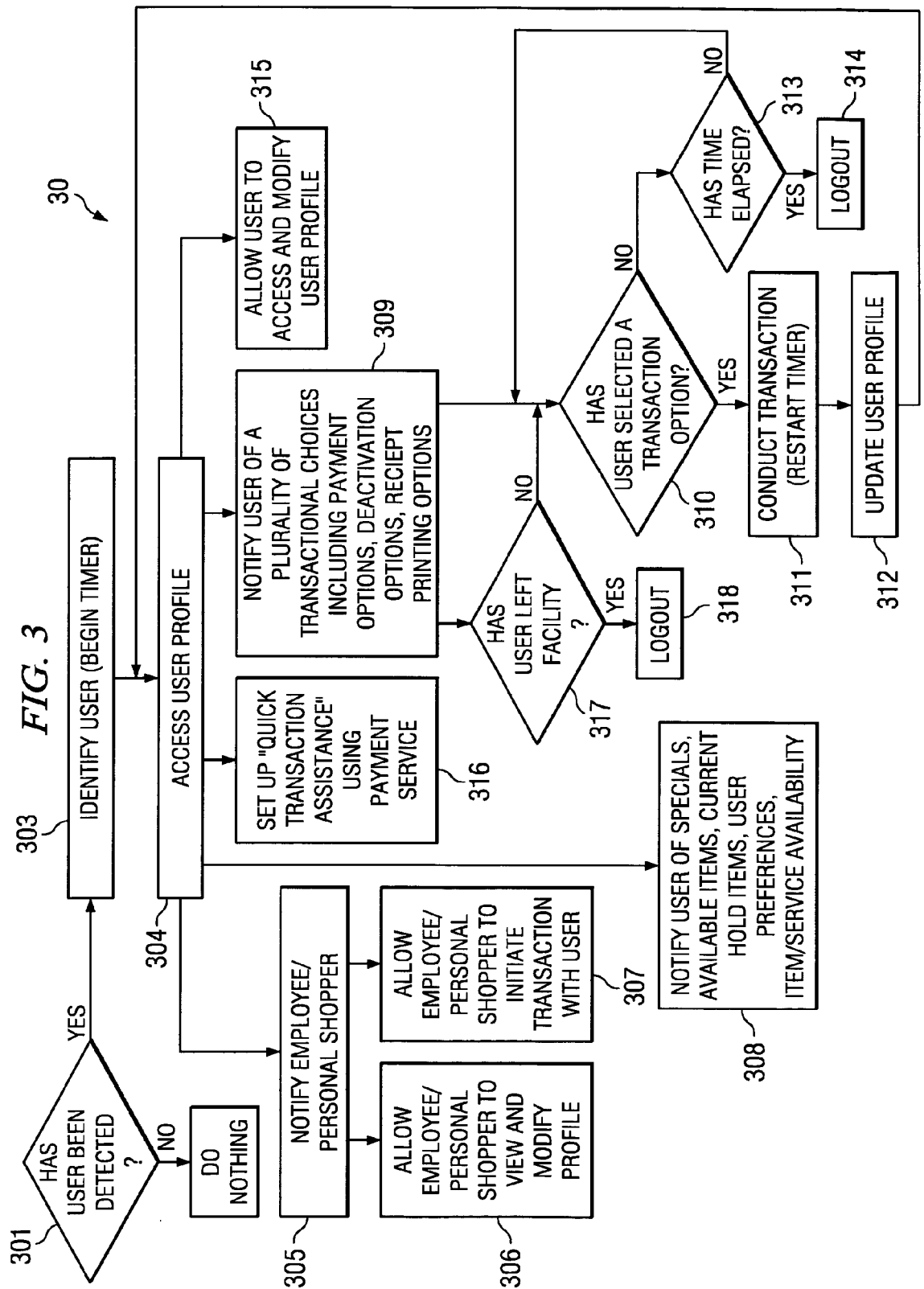

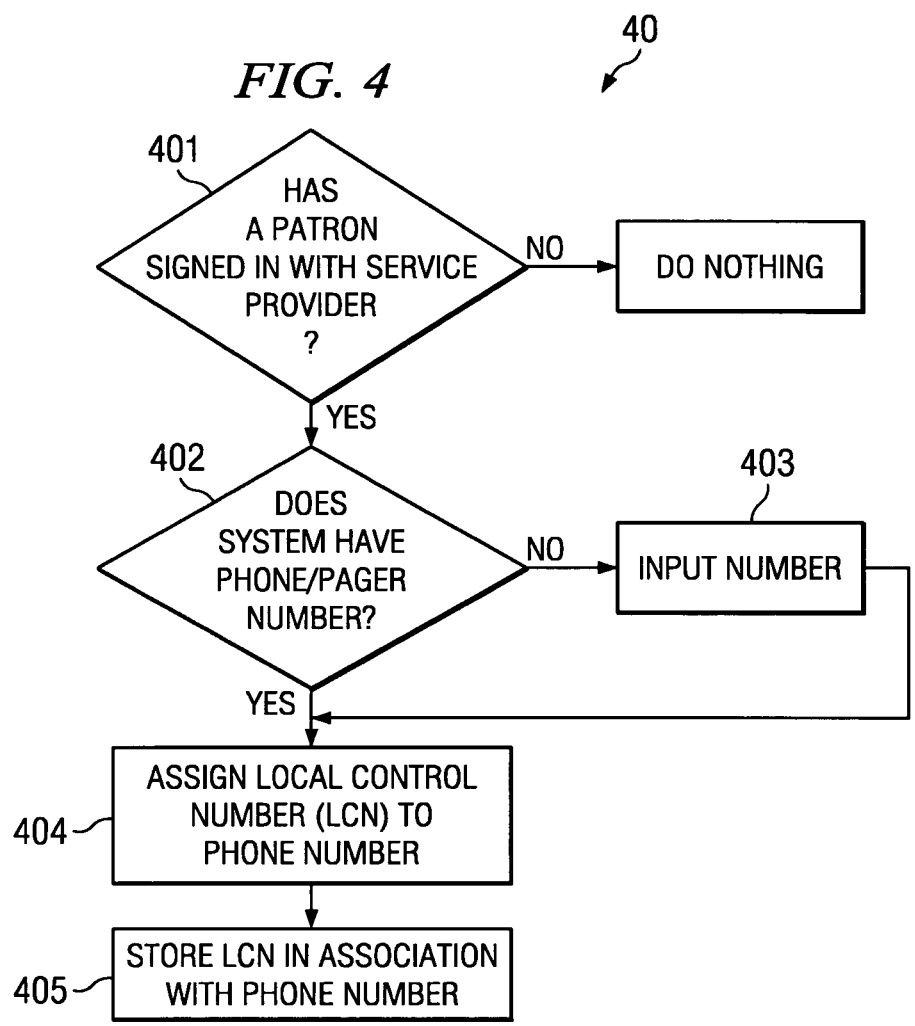

SYSTEM AND METHOD FOR USER CONTROLLED LOG-IN; INTERACTING AND LOG-OUT

RELATED APPLICATIONS

This application is related to co-pending and commonly assigned U.S. patent application Ser. No. 10/646,579, filed Aug. 22, 2003, entitled "SYSTEM AND METHOD OF INTEGRATING LOYALTY/REWARD PROGRAMS WITH PAYMENT IDENTIFICATION SYSTEMS," and Ser. No. 10/877,276, filed Jun. 25, 2004, entitled "SYSTEM AND METHOD FOR COORDINATING PAYMENT IDENTIFICATION SYSTEMS," and U.S. patent application Ser. No. 11/102,544, filed Apr. 8, 2005, entitled "SYSTEM AND METHOD FOR PATRON NOTIFICATION USING THE PATRON'S WIRELESS DEVICE," the disclosures of which are hereby incorporated herein by reference.

TECHNICAL FIELD

This invention relates to user transactional systems and more particularly to such systems and methods in which a user logs into a store or other facility, transacts business and logs out, all under control of the user.

BACKGROUND OF THE INVENTION

Shopping, particularly shopping at a physical facility, has become a way of life. In one form or another, shopping is as old as civilization itself and has not varied a great deal, other than perhaps the now extremely wide array of goods and services that are available to the shopper.

Indeed, the number of choices that a modern shopper has is sometimes overwhelming. Thus, often a shopper needs assistance with his/her purchases. This assistance relates not only to styles, but to sizes (especially for gift items) and color coordination, and extends to the financial aspect of shopping, such as credit available or credit remaining on a gift card, or the availability of coupons or other money saving promotions.

Often, a shopper will have made a mental (or physical) note of some item that the shopper wanted to buy on his/her next visit to the store, but memories (and notes written on slips of paper) being what they are the desired item is forgotten about when the user is in the store.

Thus, while PDAs and like devices have eliminated some of the "memory" issues associated with visiting a merchant's facility (whether physically or virtually), these devices are attuned only to the shopper's needs and do not match the desires of the shopper with the merchandise and services available at a particular location.

BRIEF SUMMARY OF THE INVENTION

There is disclosed a system in which a user controls the log-in, transaction, and log-out process with respect to a merchant. The user's presence at the merchant's facility triggers the log-in process, such that the merchant's systems become aware of the user's presence. Once the user is registered with the merchant, information and services become available to the user without further action required by the user. Transactions are facilitated, specials are brought to the user's attention, and personal shopping becomes available while the user remains in the facility. Upon leaving the facility, or after a certain elapsed time with a transaction being consummated, the user is logged-out of the system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 3 shows one embodiment of a process illustrating log-in, transaction, and log-out;

FIG. 4 shows one embodiment of a process illustrating number registration; and

DETAILED DESCRIPTION OF THE INVENTION

Figure 1:
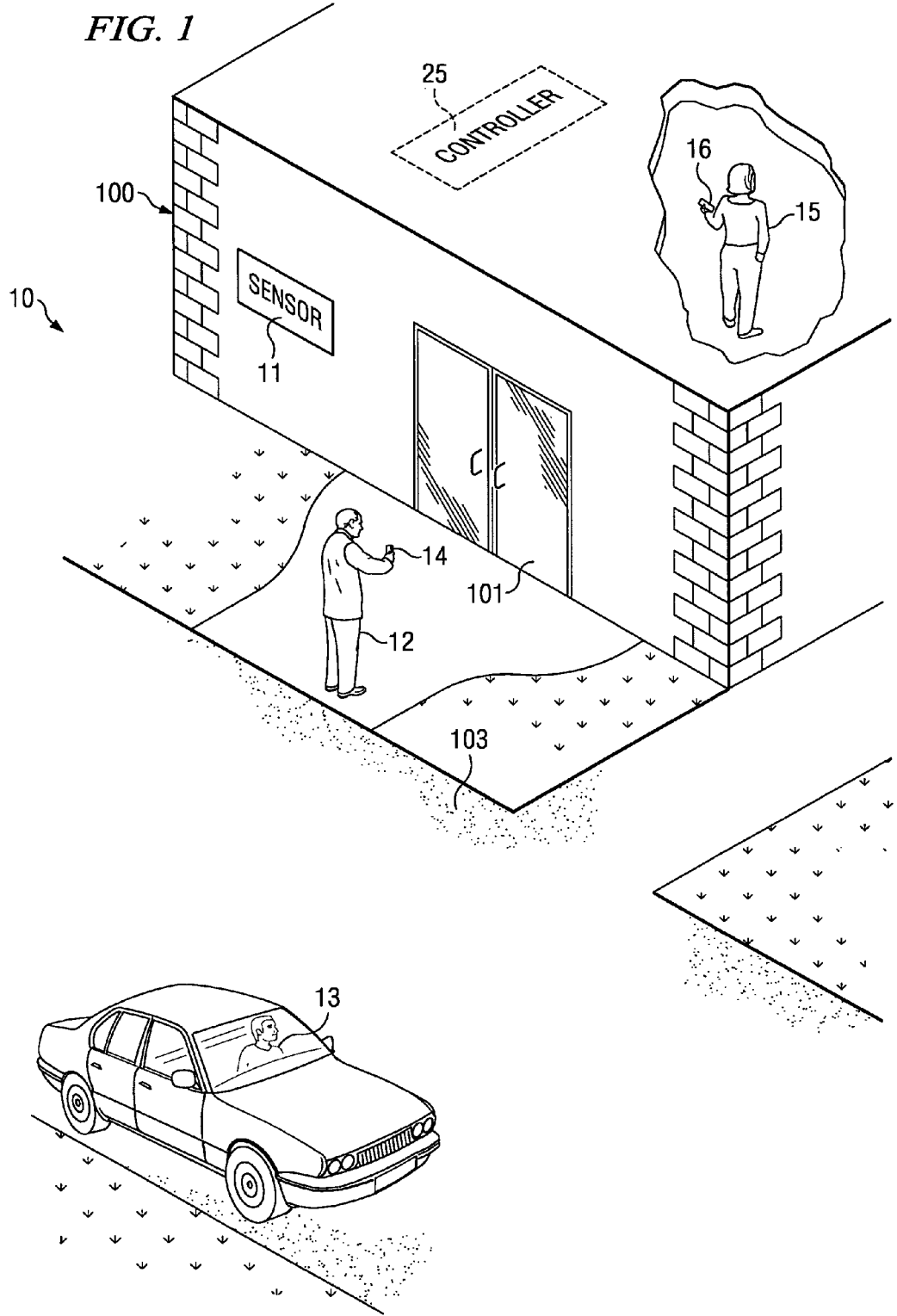
FIG. 1 shows one embodiment of the invention used with respect to a facility.

FIG. 1 shows one embodiment 10 of the invention when used with respect to a facility, such as facility 100. When user 12 arrives at the facility, the user is detected, process 301 of FIG. 3, and logged into the facility. The log-in can be controlled by the user by using a mobile device, such as cell phone 14, to call a log-in number, or by having a magnetic (or near-field device) strip placed in contact with (or in proximity to) sensor 11. In some situations, the log-in can be accomplished without action being taken by the user, for example, by knowing the geographical position of the user, which may be broadcast from the user's wireless device along with the identity of the user. The wireless device would know its location by GPS or otherwise. Bluetooth, NFC, LBS, E911, or IVR technology may be used to make the user's presence known inside facility 100.

Alternatively, the user's wireless device can periodically emit a code identifying the user such that when the user is in proximity of the facility, the user is logged-in. Using such a system, when a user, such as user 13, drives past the facility along street 103, the user could be temporarily logged-in to the facility such that specials or other information, as will be discussed hereinafter, can be communicated to the user.

For example, assume that after a previous visit, the user entered into a user profile (perhaps from a home PC) a list of desired items, or perhaps the user indicated that he/she wanted to purchase an item at a given price point. In such a situation, when the user is driving by (or otherwise logged-in), the user would receive a reminder that he/she wanted to buy item X and that the item is now available at the desired price. A user also may visit a merchant's website to arrange a shopping or item list to identify what he/she may want to purchase at the merchant's store. Then, the list may be available to the user's cell phone, for example, for use when the customer nears or enters the merchant's facility.

Assume now that user 12 walks into facility 100 and sensor 11 signals his/her presence within facility 100. As shown in FIG. 3, embodiment 30, process 301, detection of the presence of user 12, causes process 303 to identify the user, and process 304 retrieves his/her user profile, for example from memory 204 of FIG. 2C. At this time a timer (process 303) is set. The identification process can be automatic, as discussed above, or could require active participation and perhaps a password, on the part of the user. The password would be important if credit or "quick" payment options are available while the user is in the facility.

The user profile accessed by process 304 can contain information about the user including, but not limited to: previous purchases, purchase characteristics, user characteristics, user preferences, receipts, discounts, payment information, identification information, monetary balances, and any other information.

Once the user's profile is retrieved, processes 308 and 309 can be used by the facility to communicate with the user. For example, the facility can notify the user of specials, available credit, the amount of money remaining on gift cards, coupons, previous on-hold or wish list items. At this point, based on the user's location in the facility, the user may learn of special offers via SMS/MMS, NFC, Bluetooth, Media, or IVR. Alternatively, the user may obtain this information by receiving an e-mail on his/her PDA or other handheld device, or the user may access the information through Internet connectivity via his/her cellular phone or handheld device. The customer also may view his/her item or shopping list, and based on the user's location, the list may be sorted to place items nearest in proximity to the user at the top of the list.

If appropriate, process 305 notifies a facility employee, such as personal shopper 15, and optionally provides the personal shopper with access to the user's profile, thereby allowing shopper 15 to view pertinent information pertaining to the shopper. This information is viewed, for example, using a wireless device, such as device 16 (FIG. 1) in the possession of shopper 15. The information supplied to the shopper can be any information, such as sizes, last purchases, birthdays, preferences, names of family members, and any other information stored in the user's profile. For security purposes, the system could limit the amount of access shopper 15 has in viewing and modifying the user's profile.

Shopper 15 also has the option of initiating a transaction with the user, process 307. For example, shopper 15 could send a list of items along with pricing and availability to the user's wireless device for consideration. Upon receipt of this list, the user could conduct the suggested transaction by, for example, purchasing the items or storing them in the user profile's wish list, process 311.

Process 309 provides the user with a plurality of transactional options while in the facility. For example, if user 12 wishes to deactivate wireless device 14 while in the store, he/she selects the deactivation option, process 310, and wireless device 14 is logged-out, process 314. Further, if the user does not desire to interact with a central server of the facility, the user may deactivate his/her wireless device accordingly.

Process 316 sets up a "quick transaction" when wireless device 14 is detected. "Quick transaction" is a process allowing user 12 to authorize payment for merchandise (or services) using wireless device 14. This authorization could be under control of the system and method discussed in the above-identified U.S. patent application, "SYSTEM AND METHOD FOR COORDINATING PAYMENT IDENTIFICATION SYSTEMS." Once "quick transaction" is set up, processes 309 and 310 allow user 12 to select a purchase option from the list of transactional options, thereby authorizing payment for an item from the facility using wireless device 14. If desired, an option from the list of transactional options could allow user 12 to select the medium from which he/she receives the purchase receipt. For example, user 12 could choose to have the receipt printed in the facility, sent to an e-mail account, or stored in his/her user profile.

Once user 12 selects a transactional option, process 310, the transaction is conducted, process 311, and recorded in the user profile, process 312. It should be noted that the transaction could be recorded in other databases as well, such as inventory tracking systems, marketing and promotion systems, and any other system which could benefit from tracking transactions. After the transaction is completed, the timer resets.

Process 315 allows user 12 to access and modify his/her user profile using wireless device 14. For example, if while user 12 is shopping in the facility he/she sees something desired but he/she cannot purchase, user 12 could access his/her user profile and add the desired item to a wish list. If applicable, user 12 could input a price point at which he/she would be willing to make the purchase, so when the price of the item is lowered to the desired purchase price, user 12 will be notified under control of process 308.

Because the user profile contains sensitive information, it is important to include security features. As such, process 313, in conjunction with processes 303 and 311, utilize a timer which determines if a sufficient amount of time has passed since the last transaction. If it has, then it is safe to assume the user has left the facility. Specifically, once the user has been identified by process 303, a timer is set. The system has a pre-determined time limit, process 313, for example twenty minutes, such that when the time limit is exceeded the system assumes the user has left the facility and logs-out the wireless device. However, if the user conducts a transaction before the time limit is exceeded, the timer is reset, process 311, and the user has another period of time to conduct another transaction before the system assumes he/she has left the facility. This step is particularly important for wireless devices which are set up with "quick transaction" to prevent unauthorized transactions.

When user 12 leaves the range of the facility's sensor 11, the system assumes the user has left the facility and logs-out wireless device 14. This process can be used in conjunction with the timer or in place of the timer and is intended to provide further security against unauthorized transactions.

It should be recognized that any number of methods could be used to log wireless device 14 out of the system, thereby ensuring the device's security. For example, the user profile could be set up such that when a triggering event occurs, the system will not allow further transactions. Some examples of triggering events include but are not limited to: a user selecting a log-off option; improper identification supplied by the user; the passage of time; the device leaving the sensor's range; passage of time without a transaction occurring; exceeding a predetermined number of transactions; exceeding a per transaction spending limit; exceeding a cumulative spending limit; conducting an unapproved transaction; or attempting to conduct a transaction outside the transactional options, or conducting transactions detectable by fraud detection systems that are deemed inappropriate for this user based on the user's profile and other information.

Figure 2A:
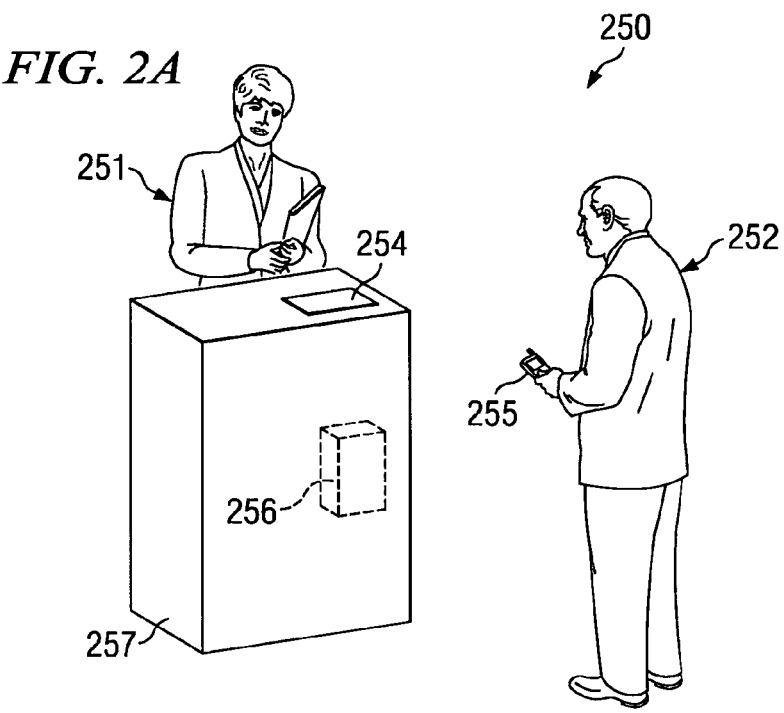
FIGS. 2A and 2B show embodiments of the invention used in different environments.

FIG. 2A shows another embodiment 250 of a system in which user 252 with a wireless device, such as cellular telephone 255, approaches podium 257 of a restaurant where host/hostess 251 is positioned. Not shown are the plurality of other users mingling around waiting for a table to become available. In the embodiment shown, host/hostess 251 enters an identification number (such as the calling number) of wireless device 255 into controller 256 in a number of ways. The identification number could be spoken or it could be Radio Frequency Identification (RFID) or Near-Field (NF) communication transferred via wireless device 255 via receiving device 254. Controller 256 is essentially the same as controller 25 as will be discussed in more detail hereinafter with respect to FIG. 2C.

In one embodiment, a control number is provided to host/hostess 251 by controller 256, or alternatively host/hostess 251 provides the control number for use by controller 256. This control number is then stored in a memory in association with the calling identification number of the user's wireless device.

When the table for user 252 becomes available, host/hostess 251 inputs the control number of user 252 into controller 256 which then establishes a communication link via either the public switch network, a wireless communication network, or a pager network (not shown) to wireless device 255 which then provides a signal or a message to user 252 indicating the availability of a table. This message, if desired, could also provide other information pertaining to the table, such as its location, etc.

While the user is waiting for a table, messages can be sent to device 255 from the business establishment. These messages can be, for example, specials of the day, menus, coupons for special pricing, music or other entertainment. One or more of these messages could be a bidirectional communication. For example, a message could say, "We are featuring a certain drink or hors d'oeuvre today. The price is $4.95. Do you wish to order?" User 252 then could choose to answer "yes," "no" or ignore the message. Any reply message would be communicated over a bidirectional link back through the network to controller 256 which would then take the necessary action to insure that the request of user 252 is performed.

While the system is shown in conjunction with a restaurant setting, any merchandise (or service) that a user is waiting for can be the subject of the system. FIG. 2B shows, for example, an embodiment in which pharmacy 21 has drive-up window 201. User 202 is in his/her vehicle waiting for service. User 202 has wireless device 22 which can communicate via RFID or NF communication via input device 24 to register an identification number, such as the calling number of wireless device 22. Alternatively, the calling number can be registered verbally with a person located at pharmacy 21, or the calling number could be registered from a remotely located user by having that user call in and verbally present the calling number. If desired, caller ID or another device could provide the identification of the wireless device of the remote user.

In one embodiment, the calling identification could be from memory 204 (FIG. 2C) of controller 25 or from a remote system, such as remote system 220 which can be, for example, the system shown in the above identified copending application entitled, "SYSTEM AND METHOD FOR COORDINATING PAYMENT IDENTIFICATION SYSTEMS."

In operation, using system 20, a prescription (Rx) or other merchandise desired from pharmacy 21 would be entered into controller 25 as well as into the normal pharmaceutical system (not shown) of establishment 21. A physician can call the Rx in to the pharmacy 21 or remotely type the Rx into controller 25 from the physician's office or other location. Attached to the prescription would be the user identification number. Controller 25 operates in conjunction with the pharmacy system, to cross-link the user identification, as obtained from the doctor, with the user's calling identification number and with a code number (if desired). An alternate method of delivering a Rx to establishment 21 is, of course, by physically hand carrying the Rx to an attendant, who would then register the user's calling identification in association with a code number.

Yet another method of delivering the Rx to establishment 21 utilizes process 30 of FIG. 3. Here, the physician types the Rx and any additionally required information into a user's profile using either the user's wireless device 23 (user 203, FIG. 2B) or a remote computer (not shown). Then, when user 203 comes within range of detector 24 (FIG. 2B) which detects and identifies user 203, as discussed above with respect to processes 301 and 303, the detected profile notifies (process 305) the pharmacy's employee of the user's presence. The pharmacy's employee can then access user 203's user profile, view/modify the Rx (process 306), and fill the Rx. If desired, the pharmacy's employee could view the user profile for other information, such as other prescribed medication or medical insurance information. Similarly, the pharmacy's employee could modify the user's profile, process 307, if necessary. For example, if the Rx has a limited number of refills, the pharmacy's employee could modify the user profile to reflect the number of refills remaining for the Rx.

The user then is free to leave the establishment or do other shopping in the establishment or elsewhere and from time to time messages can be delivered to the user using, for example, the code number, with respect to other services available, such as specials, coupons, rebates, etc.

Figure 2C:
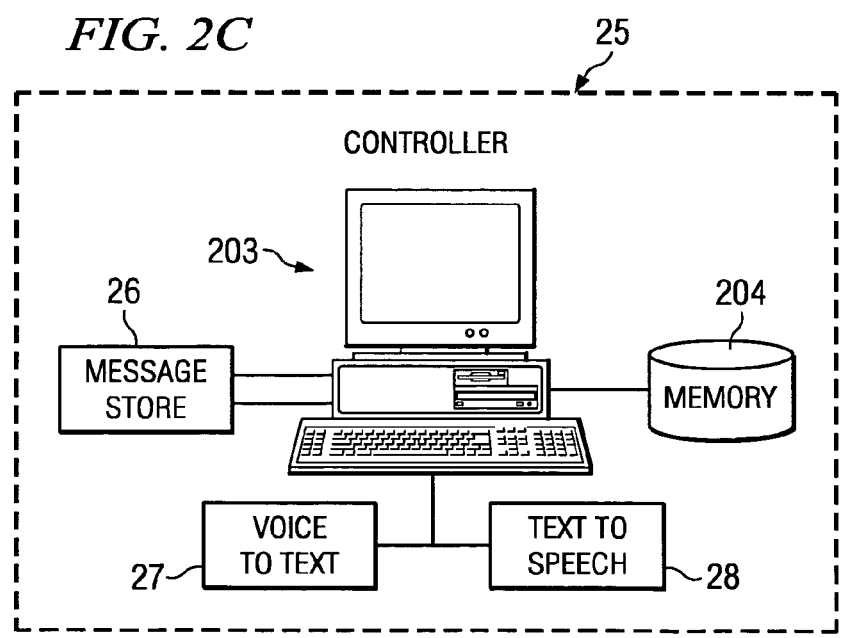
FIG. 2C shows one embodiment of a controller for use in the embodiment.
Figure 2B:
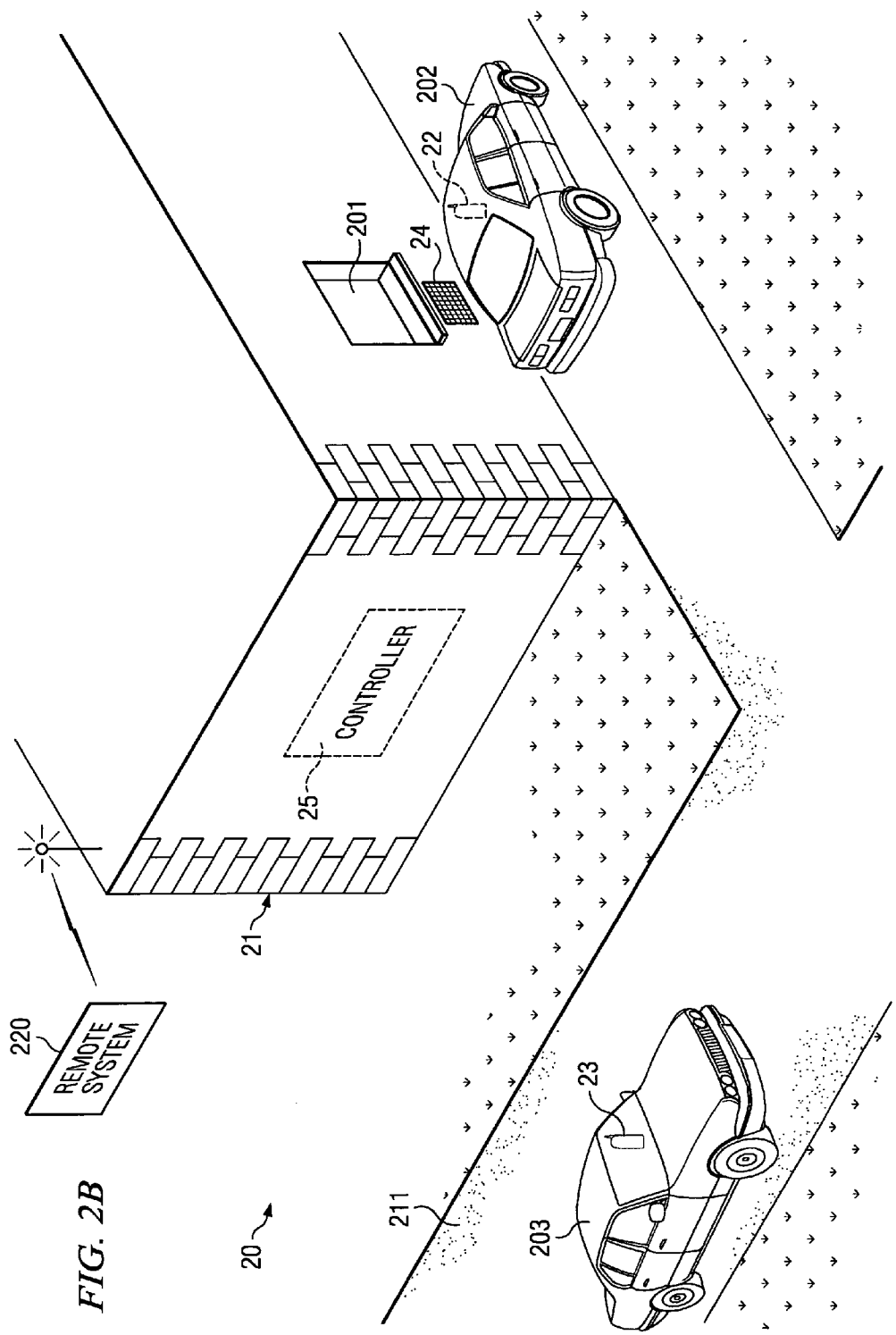

At the time when the Rx becomes available, the code number associated with the Rx is communicated to controller 25 of FIG. 2B which, in one embodiment shown in FIG. 2C, has computer 203, memory 204, message store 26, voice-to-text device 27, and text-to-speech device 28, operating in association therewith. When the code number of the available Rx arrives at controller 25, controller 25 then retrieves from memory the user's calling number, such as the calling number of wireless device 23 for user 203. A proper message is then selected from message store 26 for communication via a communication link to user device 23. This communication link can be established locally from establishment 21 or it can be established from remote system 220.

In some instances during the filling process of the Rx, the pharmacist may require additional information about the patient or a clarification of the patient's birth date or other information. If the information is available, for example, in memory 204, then upon initiation of a request, the information can be provided from memory. In some situations, the request for additional information will be sent from controller 25 to the user, such as user 203, via wireless device 23 on a bidirectional link under control of the assigned control code. The user could be asked for a birth date, an address, or other information. The user then can communicate the information, either using a touch pad or verbally back to the pharmacist. The verbal communications could be, if desired, translated by voice-to-text device 27.

When user 203's Rx is ready, a communication is sent from message store 26 through the system to wireless device 23 so that user 203 can drive up to window 201 to retrieve his/her filled Rx. As the user is approaching window 201, wireless device 203 could identify itself, for example, via RFID or NF detector 24, and the proper Rx would be ready when user 203 arrives at window 201. If desired, when user 203 is notified that the Rx (or other merchandise) is available, a price could be included in the message and the user given the opportunity to authorize payment for the merchandise at that time. This authorization could be under control of the system and method discussed in the above-identified U.S. patent application, "SYSTEM AND METHOD FOR COORDINATING PAYMENT IDENTIFICATION SYSTEMS."

Again, it should be pointed out that while the inventive concepts have been discussed with respect to a pharmacy, any type of establishment can utilize the concepts discussed herein so that a user can register (or have registered) his/her calling identification, and when the merchandise is ready, the user will be notified. While the user is waiting for such notification, other messages can be delivered to the user pertaining to services available, either at the establishment or in conjunction with the desires of the user.

FIG. 4 shows one embodiment of flow chart 40 illustrating the processes of FIGS. 2A and 2B. Process 401 determines whether a user has signed in with a service provider. The service provider can be a restaurant, a pharmacy, or any other type of commercial environment where notification of an event is important. Process 402 determines whether the system already has a calling phone or pager number of the wireless device used by the user. If the system does not already have that information, then process 403 controls the input of that calling information number. This could be by RFID or NF communication, caller ID, verbal with a voice-to-text conversion, (such as speech-to-text converter 27, FIG. 2C).

Process 404 assigns a local control number (LCN) to the phone number. Note that process 404 is not necessary and the system could, if desired, use the actual phone number or caller identification number of the wireless device. For ease of discussion herein it will be assumed that an LCN is utilized. The LCN is stored in association with the phone number via process 405. This storage could be, for example, in memory 204 (FIG. 2C) of controller 25 under control of computer 203, but any other system, either local to the physical location of the user or the place of establishment or in a remote system, such as remote system 220 (FIG. 2B) could be used.

Figure 5:
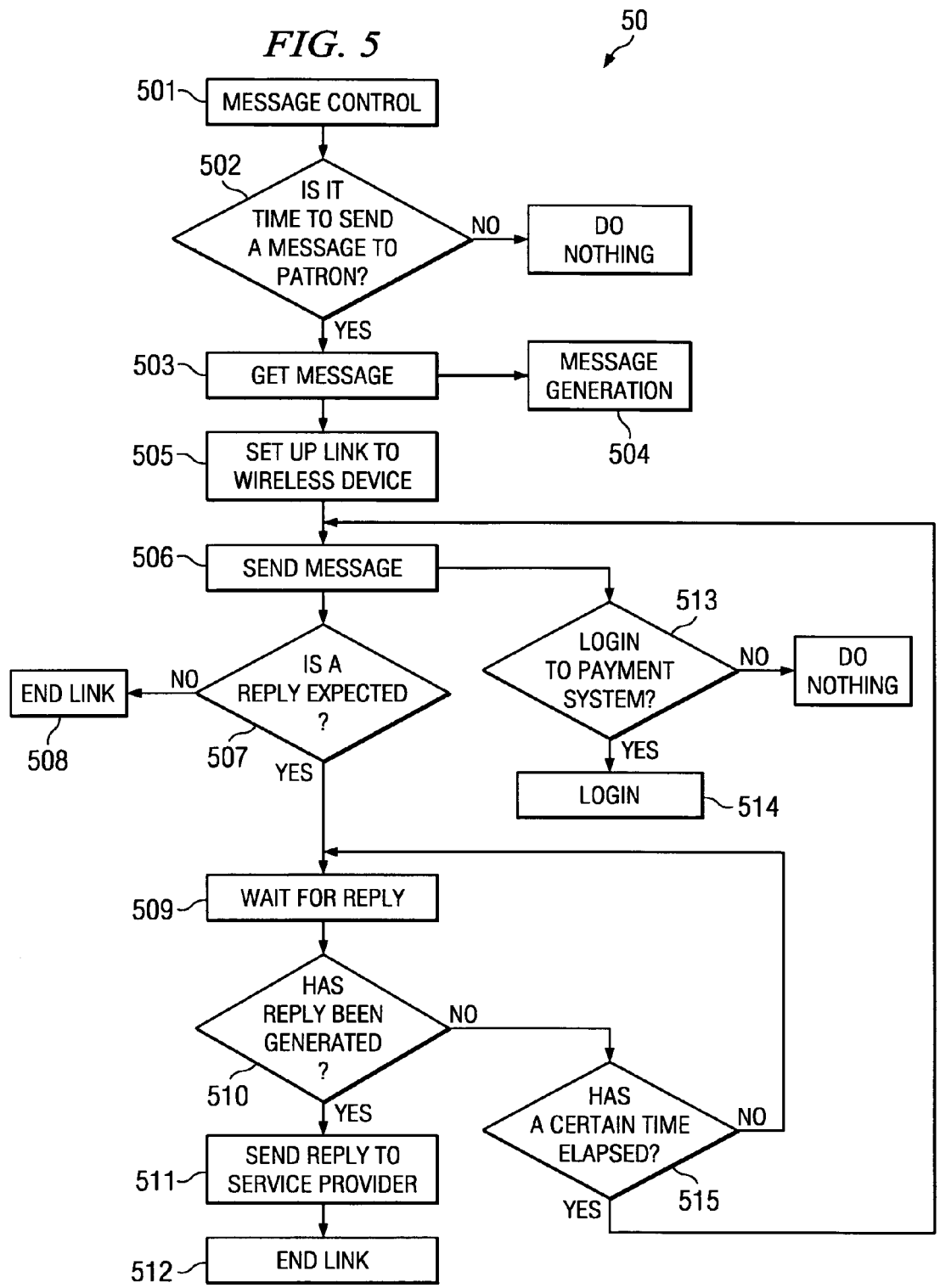
FIG. 5 shows one embodiment of a process illustrating user message control.

FIG. 5 shows an embodiment 50 of a process for receiving messages and notifications and communicating those messages to a user from time to time. Process 501 is the message control which determines which messages are to be sent at a given time. These messages can be prerecorded and selected by identification number or they could be input into the system live by a host/hostess, pharmacist, or other establishment member and converted if desired to speech via text-to-speech device 28 of FIG. 2C.

The messages could contain information including but not limited to: the availability of a service, product, promotion, discount, special pricing, or payment option.

Process 502 determines if it is time to send a message to a user. This determination can be, for example, based on the fact that an Rx is filled or that other merchandise or services are available. The time of the message can be controlled such that, for example, if an Rx is filled in the middle of the night, the notification will not go out until morning. Likewise, the message could be sent immediately following the detection of wireless device within range of sensor 11.

Process 503, in conjunction with process 504, generates the message and/or retrieves it from a data store and sets up a link to the wireless device via process 505 under control of controller 25 (FIG. 2C). The message is then sent via process 506 to either the public switched network, internet connection, packed switched network or otherwise, in accordance with the calling identification number provided during the initial registration period, process 40 of FIG. 4. Process 513 inquires whether log-in to the payment system is desired, and if so, process 514 logs into the payment system.

Process 507 determines if a reply is expected, i.e., bidirectional communication has been set up. If not, then the original message link is terminated via process 508. However, if a reply is expected, then process 509, in conjunction with process 510, determines if a reply has been generated, and if so, then the reply is sent, process 511, and the link is ended, process 512. Note that process 510 can be established such that if a reply is not generated within a certain time a repeat message is sent to the user to try to establish a bidirectional communication so as to obtain a reply message under control of process 515.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system of providing a shopping list that was previously created by a user, wherein the shopping list is provided based on a proximity of a wireless device that is associated with the user to a host device, comprising:

a host device having one or more processors configured by one or more computer program instructions to:
determine that a wireless device associated with a user is within a proximity of the host device;
obtain an identifier related to the wireless device when the wireless device is within the proximity of the host device;
obtain a pre-stored shopping list based on the obtained identifier, wherein the pre-stored shopping list is: (i) obtained after the wireless device is within the proximity of the host device, and (ii) pre-stored in association with the identifier; and
provide the pre-stored shopping list to the wireless device while the wireless device is within the proximity of the host device.

2. The system of claim 1, wherein the wireless device comprises an active wireless device.

3. The system of claim 1, wherein the host device is further configured to:

facilitate a purchase of at least one item of the pre-stored shopping list.

4. The system of claim 1, wherein the host device is further configured to:
deactivate the wireless device with respect to the host device.

5. The system of claim 4, wherein the host device is further configured to:
deactivate the wireless device with respect to the host device when the wireless device is no longer within the proximity of the host device.

6. The system of claim 4, wherein the host device is further configured to:
deactivate the wireless device with respect to the host device when a limit on an account associated with the wireless device has been achieved.

7. The system of claim 4, wherein the host device is further configured to:
receive an indication that a deactivate option has been selected at the wireless device to initiate the deactivation.

8. The system of claim 4, wherein the host device is further configured to:
determine that a duration of time in which an occurrence of a transaction has not occurred; and
deactivate the wireless device with respect to the host device when the duration of time has exceeded a threshold duration.

9. The system of claim 1, wherein the pre-stored shopping list comprises a plurality of items, and wherein the host device is further configured to:
determine a location of the wireless device;
determine a location of at least two of the plurality of items of the pre-stored shopping list; and
sort the at least two of the plurality of items of the pre-stored shopping list based on the location and the location of each of the plurality of items.

10. The system of claim 1, wherein the host device is further configured to:
determine a coupon based on the obtained identifier; and
communicate the coupon to the wireless device.

11. The system of claim 1, wherein the host device is further configured to:
determine a location of the wireless device; and
determine the coupon based on the location of the wireless device.

12. The system of claim 1, wherein the host device is further configured to:
determine an item and a desired price at which the item will be purchased based on the obtained identifier;
determine that a current price for the item is at or below the desired price; and
communicate an indication that the current price is at or below the desired price.

13. The system of claim 1, wherein the host device is further configured to:
identify the wireless device without active user participation.

14. The system of claim 1, wherein the host device is further configured to:
identify the wireless device without active user participation.

15. The system of claim 1, wherein the host device is further configured to:
communicate to the wireless device a prompt to provide information; and
receive from the wireless device a response to the prompt to provide information.

16. The system of claim 15, wherein the prompt to provide information comprises a prompt to provide information to fill a prescription.

17. The system of claim 1, wherein the host device is further configured to:
cause an order to be processed after the wireless device is within the proximity of the host device.

18. The system of claim 17, wherein the order to be processed comprises a prescription.

19. The system of claim 1, wherein the host device is associated with a website, and wherein the host device is further configured to:
receive the shopping list through the website; and
cause the shopping list to be pre-stored in association with the user.

20. A system of providing a shopping list that was previously created by a user, wherein the shopping list is provided based on a proximity of a wireless device that is associated with the user to a host device, comprising:
a host device having one or more processors configured by one or more computer program instructions to:
determine a presence of a wireless device associated with the user when the wireless device is within a proximity of the host device;
obtain an identifier related to the wireless device when the wireless device is within the proximity of the host device;
obtain a pre-stored shopping list based on the obtained identifier, wherein the pre-stored shopping list is: (i) obtained after the wireless device is within the proximity of the host device, and (ii) pre-stored in association with the identifier;
provide the pre-stored shopping list to the wireless device while the wireless device is within the proximity of the host device; and
facilitate a plurality of transactional interactions in association with the wireless device while the wireless device is within the proximity of the host device, wherein the plurality of transactional interactions are based on the pre-stored shopping list.

21. The system of claim 20, wherein the wireless device comprises an active wireless device.

22. The system of claim 20, wherein at least one of the plurality of transactional interactions comprises a purchase transaction.

23. The system of claim 20, wherein the host computer is further configured to:
deactivate the wireless device with respect to the host device.

24. The system of claim 23, wherein the host device is further configured to:
deactivate the wireless device with respect to the host device when the wireless device is no longer within the proximity of the host device.

25. The system of claim 23, wherein the host device is further configured to
deactivate the wireless device with respect to the host device when a limit on an account associated with the wireless device has been achieved.

26. The system of claim 23, wherein the host device is further configured to:
receive an indication that a deactivate option has been selected at the wireless device to initiate the deactivation.

27. The system of claim 23, wherein the host device is further configured to:
   determine that a duration of time in which an occurrence of a transaction has not occurred; and
   deactivate the wireless device with respect to the host device when the duration of time has exceeded a threshold duration.

28. The system of claim 20, wherein the host device is further configured to:
   notify an employee associated with the host device of the proximity of the wireless device.

29. The system of claim 28, wherein the employee comprises a personal shopper.

30. A system, comprising:
   a database comprising a user profile; and
   a host device having one or more processors configured by one or more computer program instructions to:
      receive an identification of at least a first item from a user;
      cause a shopping list comprising the identification of the first item to be stored at the database in association with the user profile such that the shopping list is pre-stored;
      determine a presence of a wireless device associated with the user when the wireless device is within a proximity of the host device;
      obtain an identifier related to the wireless device when the wireless device is within the proximity of the host device;
      obtain the pre-stored shopping list based on the obtained identifier and the user profile, wherein the pre-stored shopping list is obtained after the wireless device is within the proximity of the host device; and
      provide the pre-stored shopping list to the wireless device while the wireless device is within the proximity of the host device.

31. The system of claim 30, wherein the host device is further configured to:
   receive from the wireless device a selection of at least one of a plurality of transactional options.

32. The system of claim 30, wherein the plurality of transactional options are determined based on the user profile.

33. The system of claim 30, wherein the plurality of transactional options comprise an availability of at least one of: a service, a product, a promotion, a discount, special pricing for said user, or payment options.

34. The system of claim 30, wherein the database further comprises of at least one of: previous purchases, purchase characteristics, characteristics of a user of the wireless device, preferences of the, receipts, discounts, payment information, identification information, or monetary business.

35. The system of claim 30, wherein the host device is further configured to:
   communicate at least a portion of the user profile to an employee associated with the host device.

36. The system of claim 35, wherein the employee comprises a personal shopper.

37. The system of claim 30, wherein the host device is further configured to:
   initiate a transaction.

38. The system of claim 30, wherein the host device is further configured to:
   receive from the wireless device an initiation of a transaction.

39. The system of claim 35, wherein the host device is further configured to:
   receive from the employee an initiation of a transaction.

40. The system of claim 30, wherein the host device is further configured to:
   receive from the wireless device information that is controlled by a user of the wireless device.

41. The system of claim 40, wherein the host device is further configured to:
   receive from the wireless device information that is controlled by the wireless device.

42. The system of claim 30, wherein the host device is further configured to: facilitate a purchase transaction using a payment service via the wireless device.

43. The system of claim 30, wherein the host device is further configured to:
   cause a receipt to be printed while the wireless device is within the proximity of the host device.

44. The system of claim 30, wherein the host device is further configured to:
   cause a receipt for a transaction to be communicated to an email account that is associated with the user.

45. The system of claim 30, wherein the host device is further configured to:
   cause a receipt for a transaction to be stored in the database.

46. The system of claim 30, wherein the wireless device comprises an active wireless device.

47. The system of claim 30, wherein the wireless device comprises a cell phone.

48. A method of providing a shopping list that was previously created by a user, wherein the shopping list is provided based on a proximity of a wireless device that is associated with the user to a host device, comprising:
   determining, by one or more processors programmed with one or more computer program instructions, that a wireless device is within a proximity of a host device;
   obtaining, by the one or more processors, an identifier related to the wireless device when the wireless device is within the proximity of the host device;
   obtaining, by the one or more processors, a pre-stored shopping list based on the obtained identifier, wherein the pre-stored shopping list: is (i) obtained after the wireless device is within the proximity of the host device, and (ii) pre-stored in association with the identifier; and
   providing, by the one or more processors, the pre-stored shopping list to the wireless device while the wireless device is within the proximity of the host device.

49. The method of claim 48, further comprising:
   receiving from the wireless device a selection of a plurality of transactional interaction options.

50. The method of claim 48, further comprising:
   determining an occurrence of an event; and
   disallowing a transactional interaction based on the event.

51. The method of claim 50, wherein the event comprises at least one of:
   a user initiated event, the wireless device being moved outside the proximity of the host device, a passage of an amount of time, a passage of an amount of time without a transaction, an improper identification provided by a user, exceeding a predetermined number of transactions, exceeding a per transaction monetary amount limit, exceeding a cumulative monetary amount limit, an unapproved transaction, or a transaction not part of the plurality of a plurality of transactional interaction options.

52. The method of claim 48, wherein the method further comprising:
   facilitating a purchase of at least one item of the pre-stored shopping list.

53. The method of claim 48, wherein the wireless device comprises an active wireless device.

54. The method of claim 48, wherein the wireless device comprises a cell phone.

* * * * *